United States Patent
Abo et al.

(10) Patent No.: US 6,243,638 B1
(45) Date of Patent: Jun. 5, 2001

(54) ELECTRONIC TRANSMISSION CONTROL SYSTEM FOR AUTOMOTIVE VEHICLE WITH CONTINUOUSLY VARIABLE AUTOMATIC TRANSMISSION

(75) Inventors: Keiju Abo, Yokohama; Masahiro Yamamoto, Kanagawa; Osamu Sato, Kanagawa; Hideaki Suzuki, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/471,326

(22) Filed: Dec. 23, 1999

(30) Foreign Application Priority Data

Dec. 25, 1998 (JP) .................................. 10-369142

(51) Int. Cl.[7] ...................................................... F16H 9/00
(52) U.S. Cl. ................................ 701/51; 701/55; 474/18; 477/45
(58) Field of Search .................................. 701/51, 55, 56, 701/66; 474/18, 23, 28; 477/45, 49, 48, 50

(56) References Cited

U.S. PATENT DOCUMENTS 5,720,692 * 2/1998 Kashiwabara .......................... 477/45

FOREIGN PATENT DOCUMENTS

| 0123456-A2 | * 1/2000 | (EP) | .................................. 100/100 |
| 7-259941 | 10/1995 | (JP) . | |

* cited by examiner

Primary Examiner—Tan Nguyen
(74) Attorney, Agent, or Firm—Foley & Lardner

(57) ABSTRACT

An electronic transmission control system for an automotive vehicle with a belt-type continuously variable automatic transmission comprises a transmission ratio control device including a first motor-driven oil pump supplying working pressure directly to a secondary pulley actuation chamber, and a second motor-driven oil pump supplying working pressure directly to a primary pulley actuation chamber and enabling working oil to come and go between the primary and secondary pulley actuation chambers therethrough. A first control section is provided for controlling the first motor-driven oil pump so that the actual secondary pulley pressure is adjusted to a target working pressure needed to hold a belt capacity of a drive belt, which belt capacity is defined as a capacity required for exerting a grip of the drive belt on primary and secondary pulleys. Also provided is a second control section which controls the second motor-driven oil pump by limiting a speed-change flow rate (or a speed-change velocity), so that the actual primary pulley pressure is prevented from reducing to below a lowest working pressure capable of holding the belt capacity.

8 Claims, 9 Drawing Sheets

FIG.11A TRANSMISSION RATIO
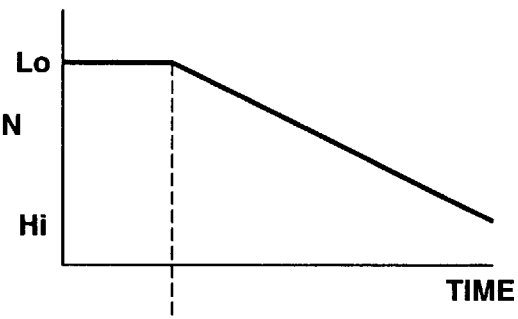
FIG.11B O/P2 FLOW RATE
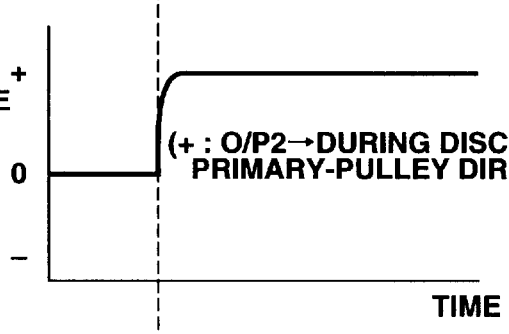
(+ : O/P2→DURING DISCHARGE IN PRIMARY-PULLEY DIRECTION)
FIG.11C Psec
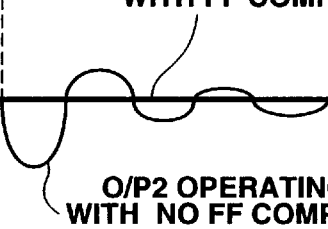
O/P2 OPERATING STATE WITH FF COMPENSATION
O/P2 OPERATING STATE WITH NO FF COMPENSATION

ELECTRONIC TRANSMISSION CONTROL SYSTEM FOR AUTOMOTIVE VEHICLE WITH CONTINUOUSLY VARIABLE AUTOMATIC TRANSMISSION

BACKGROUND OF THE INVENTION

1. Field of the Invention

The present invention relates to an electronic transmission control system for an automotive vehicle employing a belt-type continuously variable automatic transmission (often abbreviated to "CVT") which uses a drive belt running in a pair of variable-width pulleys to provide varying gear ratios (transmission ratios or pulley ratios), and specifically to techniques for directly efficiently controlling working pressures of adjustable flanges (or axially-slidable flanged pistons) of both primary and secondary pulleys of the CVT by the use of two motor-driven oil pumps.

2. Description of the Prior Art

Japanese Patent Provisional Publication No. 7-259941 has disclosed a transmission control system for a belt-type continuously variable automatic transmission (CVT). Generally, the V groove of a primary pulley of the belt-type CVT is constructed by a stationary flange and an adjustable flange axially slidable on linear ball bearing splines for varying the width of the V groove of the primary pulley by hydraulic pressure (often called a "primary pulley pressure" or a "speed-change control pressure"), whereas the V groove of a secondary pulley is constructed by a stationary flange and an adjustable flange axially slidable on linear ball bearing splines for varying the width of the V groove of the secondary pulley by at least hydraulic pressure (often called a "secondary pulley pressure" or a "regulated line pressure"). The CVT has a hydraulic modulator or a hydraulic control unit for controlling the working pressure of the adjustable flange (the flanged piston) of each of the primary and secondary-driving and driven-pulleys. The hydraulic control unit includes a line pressure control valve which regulates the hydraulic pressure of working fluid discharged from a sole oil pump and then produces the regulated line pressure (the secondary pulley pressure $P_{sec}$) applied to a secondary pulley actuation cylinder, and a speed-change control valve which further regulates the line pressure and then generates the speed-change control pressure (the primary pulley pressure $P_{pri}$) applied to a primary pulley actuation cylinder. The sole oil pump is commonly driven by an engine. The line pressure is regulated so that there is no slippage of a drive belt (usually a single segmented steel belt) running in the primary and secondary pulleys.

SUMMARY OF THE INVENTION

In the conventional transmission control system, however, the working pressures of the adjustable flanges of the primary and secondary pulleys are produced by modulating or regulating the hydraulic pressure of working oil discharged from the engine-driven sole oil pump (a sole hydraulic pressure source) by way of the hydraulic control unit. Thus, there are the following several drawbacks.

(i) The conventional system requires complicated hydraulic circuits and control valves, and therefore there are increased tendencies for oil leakage from each of control valves and/or hydraulic circuits to occur. This increases energy loss.

(ii) In case of the use of an engine-driven oil pump, if a specified discharge from the oil pump is designed to insure a discharge of working fluid at low engine speeds, there is a tendency of excessive supply of working oil discharged from the pump at high engine speeds. In such a case, superfluous oil must be drained, thus resulting in wasteful energy consumption.

(iii) Additionally, in case of the use of an engine-driven oil pump, there is no hydraulic pressure produced by the pump while the engine is not running. Thus, the conventional system, which uses an engine-driven oil pump, cannot be used for a so-called idle-stop control according to which the engine is also stopped during the vehicle standstill state.

To eliminate the previously-discussed drawbacks, it is desirable to directly control the working pressures of the adjustable flanges of the primary and secondary pulleys by the use of two electric-motor-driven oil pumps. However, when the working pressures of the adjustable flanges of the primary and secondary pulleys are controlled independently of each other with the use of the two motor-driven oil pumps, a considerably large energy may be consumed by the two oil pumps for working-oil transfer between the primary and secondary pulleys during speed-change control action, especially in a system that a desired primary pulley pressure is supplied as a differential pressure from atmospheric pressure by a first motor-driven pump and a desired secondary pulley pressure is also supplied as a differential pressure from atmospheric pressure by a second motor-driven pump. This undesiredly increases a maximum required output from each of the motor-driven oil pumps, thus requiring a large-size motor-driven pump. To avoid this, that is, to solve the problem of large-sizing of the two motor-driven pumps, a control system can be constructed so that a motor-driven oil pump mainly associated with a secondary pulley serves as a pressure hold pump, whereas a motor-driven oil pump mainly associated with a primary pulley serves as a speed-change pump, and so that the working oil comes and goes between the primary pulley actuation cylinder (or the primary pulley actuation chamber) and the secondary pulley actuation cylinder (or the secondary pulley actuation chamber) through the previously-noted speed-change pump. In controlling the speed-change pump by adjusting a required flow rate (which will be hereinafter referred to as a "speed-change flow rate" and is needed for speed-change control action) or a "speed-change velocity" being defined as the time rate of change of the transmission ratio (the pulley ratio) during shifting from an actual transmission ratio (an actual pulley ratio) to a desired transmission ratio (a target pulley ratio), so that the actual pulley ratio is adjusted to the desired pulley ratio, especially during downshifting action where the working oil is released from the primary pulley actuation chamber, there is another problem. That is to say, there is a possibility that the amount of stroke (axial sliding motion) of the adjustable flange of each of the pulleys cannot follow up satisfactorily in comparison with a flow rate of working fluid obtained by the speed-change pump control, in presence of output of an excessive command signal value for the speed-change flow rate (or an excessive command signal value for the speed-change velocity). As a result, the actual primary pulley pressure reduces to below a lowest primary pulley pressure below which there is a possibility of slippage of the drive belt. In such a case, assuming that the excessive speed-change flow rate command signal value or the excessive speed-change velocity command signal value retains unchanged, there may result a lack of a so-called belt capacity (that is, a lack of a drive-belt. slippage preventable capacity) in the primary pulley side. In other words, there is a possibility of slippage of the drive belt (the segmented steel belt) running in the primary and secondary pulleys.

Accordingly, it is an object of the invention to provide an electronic transmission control system for an automotive vehicle with a belt-type continuously variable automatic transmission which avoids the aforementioned disadvantages of the prior art.

It is another object of the invention to provide an electronic transmission control system for an automotive vehicle with a belt-type continuously variable automatic transmission (CVT), which is capable of reducing fuel consumption of each of oil pumps employed in the control system, and of performing a so-called idle-stop control, and of preventing undesired slippage of a drive belt running in a pair of pulleys of the CVT by ensuring a so-called belt capacity (corresponding to a drive-belt slippage preventable capacity) in the primary pulley side (the speed-change-control-action side pulley) even during downshifting action.

In order to accomplish the aforementioned and other objects of the present invention, an electronic transmission control system for an automotive vehicle with a belt-type continuously variable automatic transmission employing a primary pulley with a primary pulley actuation chamber, a secondary pulley with a secondary pulley actuation chamber, and a drive belt running in the primary and secondary pulleys whose effective diameters are continuously variable to provide varying pulley ratios, comprises a transmission ratio control device including a first motor-driven oil pump which supplies working pressure directly to one of the primary and secondary pulley actuation chambers, a second motor-driven oil pump which supplies working pressure directly to the other of the primary and secondary pulley actuation chambers, and enables working oil to come and go between the primary and secondary pulley actuation chambers therethrough, pressure sensors which detect an actual working pressure supplied to the one of the primary and secondary pulley actuation chambers, and an actual working pressure supplied to the other of the primary and secondary pulley actuation chambers, a first control section which controls the first motor-driven oil pump so that the actual working pressure supplied to the one of the primary and secondary pulley actuation chambers is adjusted to a target working pressure needed to hold a belt capacity of the drive belt, the belt capacity being defined as a capacity required for exerting a grip of the drive belt on the primary and secondary pulleys, and a second control section which controls the second motor-driven oil pump by limiting one of a speed-change flow rate and a speed-change velocity, so that the actual working pressure supplied to the other of the primary and secondary pulley actuation chambers is prevented from reducing to below a lowest working pressure capable of holding the belt capacity, in controlling one of the speed-change flow rate and the speed-change velocity so that an actual pulley ratio is adjusted to a target pulley ratio during speed-change control action, the speed-change flow rate being defined as a required flow rate needed for the speed-change control action, and the speed-change velocity being defined as a time rate of change of the pulley ratio.

According to another aspect of the invention, a belt-type continuously variable automatic transmission whose pulley ratio is defined as a ratio of transmission input to output speed and is changeable continuously, comprises a primary pulley serving as a drive pulley and having a primary pulley actuation chamber, a secondary pulley serving as a driven pulley and having a secondary pulley actuation chamber, a drive belt running in the primary and secondary pulleys whose effective diameters are continuously variable to provide varying pulley ratios, a transmission ratio control device including a first motor-driven oil pump which supplies working pressure directly to the secondary pulley actuation chamber, a second motor-driven oil pump which supplies working pressure directly to the primary pulley actuation chamber and enables working oil to come and go between the primary and secondary pulley actuation chambers therethrough, pressure sensors which detect an actual primary pulley pressure supplied to the primary pulley actuation chamber, and an actual secondary pulley pressure supplied to the secondary pulley actuation chamber, a first control section which controls the first motor-driven oil pump so that the actual secondary pulley pressure is adjusted to a target working pressure needed to hold a belt capacity of the drive belt, the belt capacity being defined as a capacity required for exerting a grip of the drive belt on the primary and secondary pulleys, a lowest working pressure arithmetic-calculation section arithmetically calculating a lowest primary pulley pressure capable of holding the belt capacity, on the basis of the pulley ratio and an input torque transmitted to the primary pulley, an arithmetic-calculation section arithmetically calculating a speed-change flow rate based on both a target pulley ratio and the actual pulley ratio and needed for speed-change control action, an arithmetic-calculation section arithmetically calculating a belt capacity holding flow rate at which a lack of the belt capacity is prevented and thus there is no slippage of the drive belt on the primary and secondary pulleys, on the basis of both the lowest working pressure and the actual primary pulley pressure, and a second control section having a data processing section performing functions; retrieving two parameters $\Delta P$ and $\Delta Q$ on the basis of a reduction rate of the primary pulley pressure from a predetermined characteristic map, the parameter $\Delta P$ being defined by taking a difference between a limit working pressure and the lowest primary pulley pressure, and the parameter $\Delta Q$ being defined by taking a difference between the speed-change flow rate and the belt capacity holding flow rate, determining the limit working pressure on the basis of both the lowest primary pulley pressure and the parameter $\Delta P$ retrieved, and updating the speed-change flow rate by the belt capacity holding flow rate obtained by subtracting the parameter $\Delta Q$ from amore recent value of the speed-change flow rate to perform a speed-change flow rate limiting control for the second motor-driven oil pump, when the actual primary pulley pressure reduces to below the limit working pressure.

According to a further aspect of the invention, a belt-type continuously variable automatic transmission whose pulley ratio is defined as a ratio of transmission input to output speed and is changeable continuously, comprises a primary pulley serving as a drive pulley and having a primary pulley actuation chamber, a secondary pulley serving as a driven pulley and having a secondary pulley actuation chamber, a drive belt running in the primary and secondary pulleys whose effective diameters are continuously variable to provide varying pulley ratios, a transmission ratio control device including a first motor-driven oil pump which supplies working pressure directly to the secondary pulley actuation chamber, a second motor-driven oil pump which supplies working pressure directly to the primary pulley actuation chamber and enables working oil to come and go between the primary and secondary pulley actuation chambers therethrough, pressure sensors which detect an actual primary pulley pressure supplied to the primary pulley actuation chamber, and an actual secondary pulley pressure supplied to the secondary pulley actuation chamber, a first control section which controls the first motor-driven oil pump so that the actual secondary pulley pressure is adjusted to a target working pressure needed to hold a belt capacity of the drive belt, the belt capacity being defined as a capacity required for exerting a grip of the drive belt on the primary and secondary pulleys, a lowest working pressure arithmetic-calculation section arithmetically calculating a lowest primary pulley pressure capable of holding the belt capacity, on the basis of the pulley ratio and an input torque transmitted to the primary pulley, an arithmetic-calculation section arithmetically calculating a speed-change flow rate Q1 based on both a target pulley ratio and the actual pulley ratio and needed for speed-change control action, and a second control section having a data processing section performing functions; retrieving a belt capacity holding flow rate Q2 capable of holding the actual primary pulley pressure above the lowest working pressure, on the basis of a pressure differential between the lowest working pressure and the actual primary pulley pressure from a predetermined characteristic map, comparing the speed-change flow rate Q1 with the belt capacity holding flow rate Q2, selecting a smaller flow rate of the speed-change flow rate Q1 and the belt capacity holding flow rate Q2 by a select-LOW process, and controlling the second motor-driven oil pump in response to the smaller flow rate selected by the select-LOW process to perform a speed-change flow rate limiting control for the second motor-driven oil pump.

According to a still further aspect of the invention, a transmission control method of an automotive vehicle with a belt-type continuously variable automatic transmission whose pulley ratio is defined as a ratio of transmission input to output speed and is changeable continuously, wherein the belt-type continuously variable automatic transmission includes a primary pulley serving as a drive pulley and having a primary pulley actuation chamber, a secondary pulley serving as a driven pulley and having a secondary pulley actuation chamber, a drive belt running in the primary and secondary pulleys whose effective diameters are continuously variable to provide varying pulley ratios, and a transmission ratio control device having a first motor-driven oil pump which supplies working pressure directly to the secondary pulley actuation chamber and a second motor-driven oil pump which supplies working pressure directly to the primary pulley actuation chamber and enables working oil to come and go between the primary and secondary pulley actuation chambers therethrough, the method comprising detecting an actual primary pulley pressure supplied to the primary pulley actuation chamber, and an actual secondary pulley pressure supplied to the secondary pulley actuation chamber, controlling the first motor-driven oil pump so that the actual secondary pulley pressure is adjusted to a target working pressure needed to hold a belt capacity of the drive belt, the belt capacity being defined as a capacity required for exerting a grip of the drive belt on the primary and secondary pulleys, arithmetically calculating a lowest primary pulley pressure capable of holding the belt capacity, on the basis of the pulley ratio and an input torque transmitted to the primary pulley, arithmetically calculating a speed-change flow rate based on both a target pulley ratio and the actual pulley ratio and needed for speed-change control action, arithmetically calculating a belt capacity holding flow rate at which a lack of the belt capacity is prevented and thus there is no slippage of the drive belt on the primary and secondary pulleys, on the basis of both the lowest working pressure and the actual primary pulley pressure, retrieving two parameters ΔP and ΔQ on the basis of a reduction rate of the primary pulley pressure from a predetermined characteristic map, the parameter ΔP being defined by taking a difference between a limit working pressure and the lowest primary pulley pressure, and the parameter ΔQ being defined by taking a difference between the speed-change flow rate and the belt capacity holding flow rate, determining the limit working pressure on the basis of both the lowest primary pulley pressure and the parameter ΔP retrieved, and updating the speed-change flow rate by the belt capacity holding flow rate obtained by subtracting the parameter ΔQ from a more recent value of the speed-change flow rate to perform a speed-change flow rate limiting control for the second motor-driven oil pump, when the actual primary pulley pressure reduces to below the limit working pressure.

According to another aspect of the invention, a transmission control method of an automotive vehicle with a belt-type continuously variable automatic transmission whose pulley ratio is defined as a ratio of transmission input to output speed and is changeable continuously, wherein the belt-type continuously variable automatic transmission includes a primary pulley serving as a drive pulley and having a primary pulley actuation chamber, a secondary pulley serving as a driven pulley and having a secondary pulley actuation chamber, a drive belt running in the primary and secondary pulleys whose effective diameters are continuously variable to provide varying pulley ratios, and a transmission ratio control device having a first motor-driven oil pump which supplies working pressure directly to the secondary pulley actuation chamber and a second motor-driven oil pump which supplies working pressure directly to the primary pulley actuation chamber and enables working oil to come and go between the primary and secondary pulley actuation chambers therethrough, the method comprising detecting an actual primary pulley pressure supplied to the primary pulley actuation chamber, and an actual secondary pulley pressure supplied to the secondary pulley actuation chamber, controlling the first motor-driven oil pump so that the actual secondary pulley pressure is adjusted to a target working pressure needed to hold a belt capacity of the drive belt, the belt capacity being defined as a capacity required for exerting a grip of the drive belt on the primary and secondary pulleys, arithmetically calculating a lowest primary pulley pressure capable of holding the belt capacity, on the basis of the pulley ratio and an input torque transmitted to the primary pulley, arithmetically calculating a speed-change flow rate Q1 based on both a target pulley ratio and the actual pulley ratio and needed for speed-change control action, retrieving a belt capacity holding flow rate Q2 capable of holding the actual primary pulley pressure above the lowest working pressure, on the basis of a pressure differential between the lowest working pressure and the actual primary pulley pressure from a predetermined characteristic map, comparing the speed-change flow rate Q1 with the belt capacity holding flow rate Q2, selecting a smaller flow rate of the speed-change flow rate Q1 and the belt capacity holding flow rate Q2 by a select-LOW process, and controlling the second motor-driven oil pump in response to the smaller flow rate selected by the select-LOW process to perform a speed-change flow rate limiting control for said second motor-driven oil pump.

BRIEF DESCRIPTION OF THE DRAWINGS

FIGS. 11A, 11B, and 11C are timing charts showing variations in the transmission ratio (the pulley ratio), variations in the flow rate of working oil discharged from the second oil pump (O/P2), and comparison between the secondary pulley pressure characteristic obtained with feed-forward compensation for the first motor-driven oil pump control signal, and the secondary pulley pressure characteristic obtained with no feed-forward compensation for the first motor-driven oil pump control signal.

DESCRIPTION OF THE PREFERRED EMBODIMENTS

Figure 2:
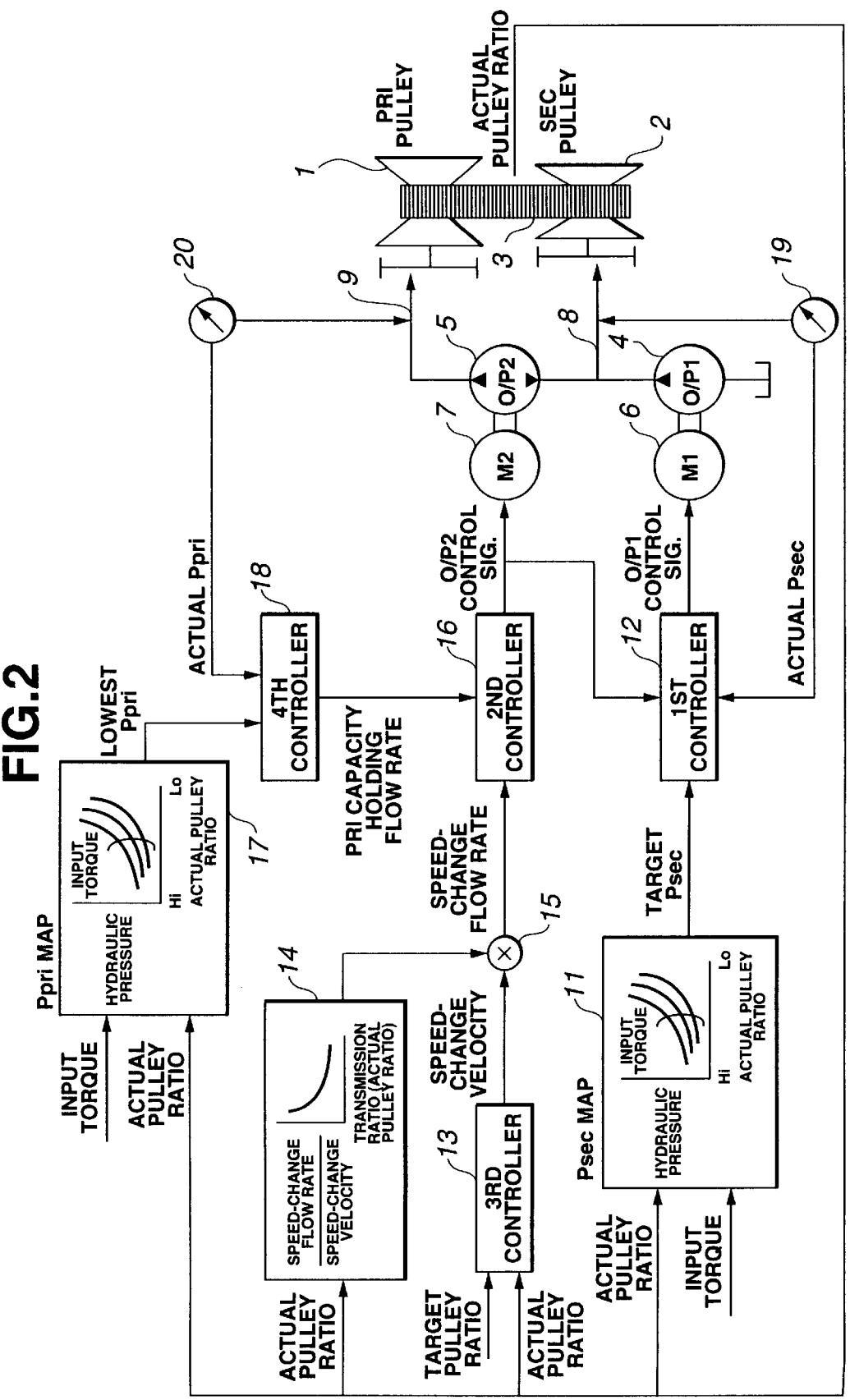
FIG. 2 is a general system diagram illustrating the belt-type continuously variable automatic transmission control system of the embodiment.

Referring now to the drawings, particularly to FIG. 2, there is shown part of a power train of an automotive vehicle with a belt-type continuously variable automatic transmission, and structural details of an electronic CVT control system, necessary for the speed-change control. As appreciated from the rightmost end of FIG. 2, the belt-type continuously variable automatic transmission (CVT) uses a drive belt 3, such as a segmented steel belt, running in a pair of variable-width pulleys 1 and 2, namely primary and secondary-driving and driven-pulleys whose effective diameters are continuously variable to provide varying pulley ratios (transmission ratios). The primary pulley 1 has a driven connection with the output shaft of an engine (not shown). Torque transmitted from the primary pulley 1 via the drive belt 3 to the secondary pulley 2 is transmitted via a final gear set to a differential gear, and then transmitted via axle driveshafts to left and right drive wheels. For the purpose of illustrative simplicity, the final gear set, the differential gear, the axle driveshafts, and the left and right drive wheels are not shown. As is generally known, the V groove of the primary pulley 1 is constructed by a stationary flange (or a stationary sheave) and an adjustable flange (or a movable sheave) axially slidable on linear ball bearing splines (not shown) for varying the width of the V groove of the primary pulley by hydraulic pressure $P_{pri}$, often called a "primary pulley pressure" or a "speed-change control pressure". Similarly, the V groove of the secondary pulley 2 is constructed by a stationary flange and an adjustable flange axially slidable on linear ball bearings (not shown) for varying the width of the V groove of the secondary pulley 2 usually by spring bias plus hydraulic pressure $P_{sec}$, often called a "secondary pulley pressure" or a "regulated line pressure". The two hydraulic pressures $P_{pri}$ and $P_{sec}$ are produced by means of a hydraulic control unit (a hydraulic actuator or a hydraulic modulator) included in the electronic CVT control system. In other words, the level of the primary pulley pressure $P_{pri}$ supplied to the primary pulley actuation cylinder (or the primary pulley actuation chamber), and the level of the secondary pulley pressure $P_{sec}$ supplied to the secondary pulley actuation cylinder (or the primary pulley actuation chamber) are both controlled by the hydraulic control unit included in the hydraulic system of a transmission ratio control means or a transmission ratio (pulley ratio) control device. As seen from the right-hand side of FIG. 2, the hydraulic control unit includes a first motor-driven oil pump 4 (denoted by O/P1 in the drawings) which directly supplies the secondary pulley pressure $P_{sec}$ into the secondary pulley actuation chamber of the secondary pulley 2 via a secondary pulley pressure line 8, and a second motor-driven oil pump 5 (denoted by O/P2 in the drawings) which directly supplies the primary pulley pressure $P_{pri}$ into the primary pulley actuation chamber of the primary pulley 1 via a primary pulley pressure line 9 and additionally enables the working fluid (oil) to come and go between the primary pulley actuation chamber and the secondary pulley actuation chamber. The electronic CVT control system outputs a first motor-driven oil pump control signal and a second motor-driven oil pump control signal to control both a first electric motor 6 (denoted by M1 in the drawings) of the first motor-driven oil pump 4 and a second electric motor 7 (denoted by M2 in the drawings) of the second motor-driven oil pump 5. The electronic transmission control system includes a target secondary pulley pressure arithmetic-calculation section 11, a first controller (or a first control section) 12, a third controller (or a third control section) 13, a speed-change flow rate arithmetic-calculation section 14, an integrator 15, a second controller (or a second control section) 16, a lowest primary pulley pressure arithmetic-calculation section (or a lowest working-pressure arithmetic-calculation section) 17, a fourth controller (or a fourth control section) 18, a secondary pulley pressure sensor 19, and a primary pulley pressure sensor 20.

Figure 3:
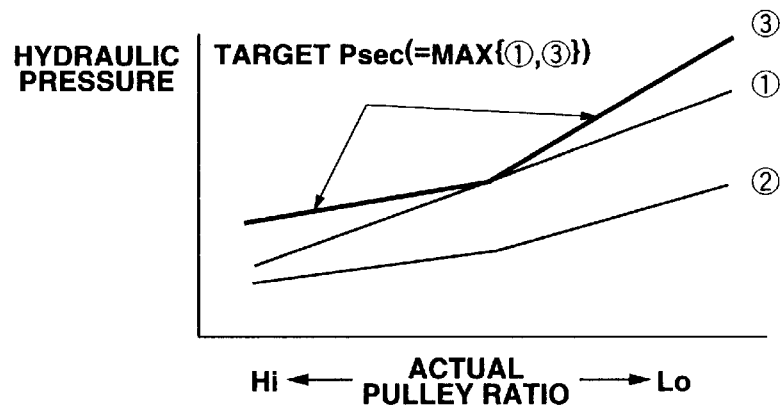
FIG. 3 is a characteristic map which is representative of the relationship between an actual pulley ratio and a hydraulic pressure and is used by a secondary pulley pressure arithmetic-calculation section incorporated in the belt-type continuously variable automatic transmission control system of the embodiment.
Figure 4:
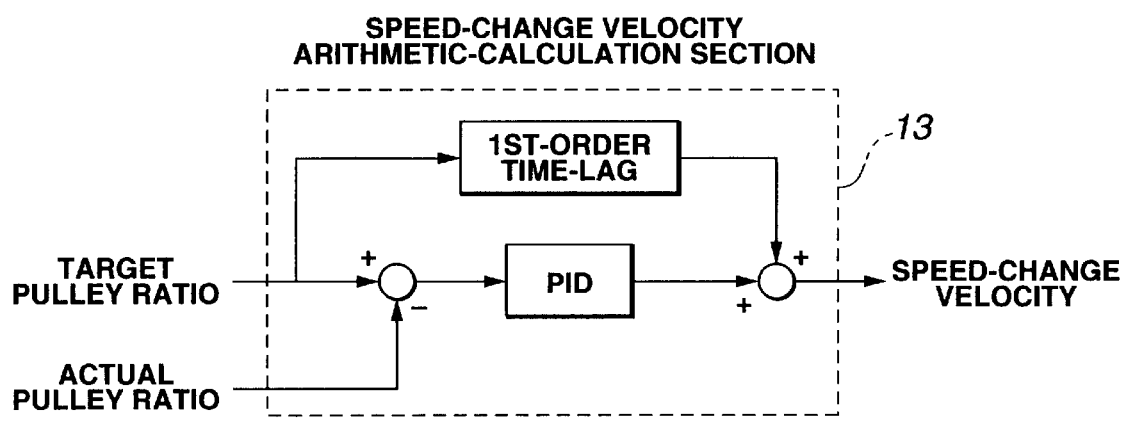
FIG. 4 is a control block diagram illustrating an example of a speed-change velocity arithmetic-calculation section incorporated in the belt-type continuously variable automatic transmission control system of the embodiment.
Figure 5:
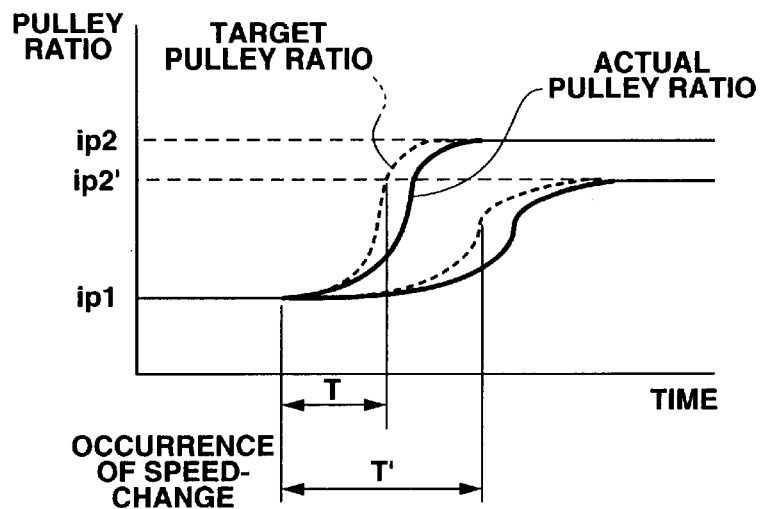
FIG. 5 is a time chart illustrating variations in a target pulley ratio and variations in an actual pulley ratio at large and small throttle openings, during kick-down downshifting action.
Figure 6A:
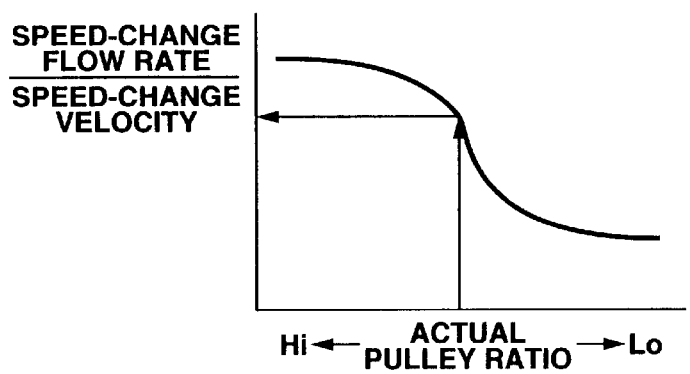
FIG. 6A is a characteristic map which is representative of the relationship between an actual pulley ratio and a ratio of a speed-change flow rate to a speed-change velocity and is used by a speed-change flow rate arithmetic-calculation section incorporated in the belt-type continuously variable automatic transmission control system of the embodiment.
Figure 6B:
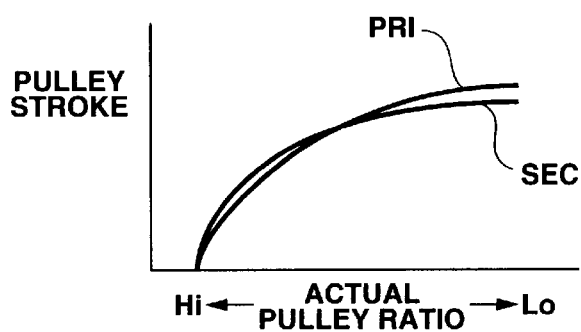
FIG. 6B is a characteristic map which is representative of the relationship between an actual pulley ratio and a pulley stroke of each of the primary and secondary pulleys.

As seen in the block 11 of FIG. 2, the target secondary pulley pressure arithmetic-calculation section 11 is designed to retrieve a target secondary pulley pressure on the basis of both an actual pulley ratio and an input torque transmitted to the primary pulley 1, from a predetermined or preprogrammed characteristic map data, and then to output the informational data, that is, the target secondary pulley pressure $P_{sec}$ retrieved from the map of the block 11, into the first controller 12. In more detail, as shown in FIG. 3, the secondary pulley pressure arithmetic-calculation section 11 actually selects a higher one of a secondary pulley pressure $P_{sec}$ which is indicated by a polygonal line ① in FIG. 3 and is needed to hold a so-called belt capacity, and a secondary pulley pressure $P_{sec}$ which is indicated by a polygonal line ③ in FIG. 3 and is needed to maintain a pulley ratio, by way of a so-called select-HIGH process MAX {①, ③}. The secondary pulley pressure $P_{sec}$, indicated by the polygonal line ③ in FIG. 3 and needed to maintain the pulley ratio, corresponds to a balance pressure which is balanced with a primary pulley pressure $P_{pri}$ which is indicated by a lower-most polygonal line ② in FIG. 3 and is needed to hold the previously-noted belt capacity. Hereupon, the belt capacity means a capacity required for exerting a grip of the drive belt 3 on two opposing inner side walls of the V groove of each of the pulleys, and thus the lack of the belt capacity means a drive-belt slippage on the pulleys 1 and 2. By way of the select-HIGH process performed within the secondary pulley pressure arithmetic-calculation section 11, the hydraulic characteristic of the higher secondary pulley pressure level indicated by the thick solid polygonal line of FIG. 3 is selected. Note that the comparatively steeply-inclined part (the right-hand side) of the thick solid polygonal line is included in the secondary pulley pressure ($P_{sec}$) indicating polygonal line ③ needed to maintain the pulley ratio, whereas the comparatively moderately-inclined part (the left-hand side) of the thick solid polygonal line is included in the secondary pulley pressure ($P_{sec}$) indicating polygonal line ① needed to hold the belt capacity. As appreciated from input and output signal lines of the block 12 of FIG. 2, the previously-noted first controller 12 performs feedback control so that the actual secondary pulley pressure sensed by the secondary pulley pressure sensor 19 is adjusted to the target secondary pulley pressure needed to hold the previously-discussed belt capacity. Additionally, as can be appreciated from the input signal line interconnecting the output terminal of the second controller 16 and the input terminal of the first controller 12, feedforward compensation, which is based on changes in the speed-change flow rate for the second motor-driven oil pump 5, is added to the above-mentioned feedback control. The first controller 12 is provided for controlling the first motor 6 of the first oil pump 4, and thus serves as a first motor control section. Actually, the feedforward compensation of the system of the embodiment is made in such a manner that the second motor-driven oil pump control signal, output from the second controller 16 to the second motor 7 of the second oil pump 5, is input into the first controller 12 as input informational data representative of changes in the speed-change flow rate, and then the feedforward compensation is executed so that changes or fluctuations in the secondary pulley pressure $P_{sec}$, arising from the operation (the pumping action) of the secondary oil pump 5, are prevented. On the other hand, the third controller 13 is comprised of a speed-change velocity arithmetic-calculation section which arithmetically calculates a speed-change velocity corresponding to the time rate of change of a transmission ratio (a pulley ratio) from an actual transmission ratio (an actual pulley ratio) to a desired transmission ratio (a target pulley ratio). The pulley ratio (the actual pulley ratio) is defined as a ratio of transmission input to output speed. The target pulley ratio or the desired pulley ratio is usually based on both vehicle speed and engine load. Actually, the speed-change velocity arithmetic-calculation section calculates the speed-change velocity on the basis of the target pulley ratio and the actual pulley ratio. The actual pulley ratio is fed back to the third controller 13, whereas the target pulley ratio is determined by engine/vehicle operating conditions, such as engine load (commonly detectable as a throttle opening or an accelerator pedal depression) and engine speed, or vehicle speed, as well as a predetermined speed-change line (which is predetermined or preprogrammed in the form of a speed-change control characteristic map). The actual pulley ratio is defined as a ratio of transmission input to output speed (that is, a ratio of a primary pulley rotational speed to a secondary pulley rotational speed). FIG. 4 shows the operational block diagram of the third controller 13 (the speed-change velocity arithmetic-calculation section). As clearly seen in FIG. 4, the third controller 13 has a first-order time-lag section and a proportional-plus-integral-plus-derivative control section (PID control section) in which the control signal is a linear combination of the error signal, its integral, and its derivative. The speed-change velocity is set to be different depending on the throttle opening (TVO), the vehicle speed, the upshifting period, the downshifting period, the selected operating range such as D, Ds, Manual, and the like. The speed-change velocity also varies depending on the given target pulley ratio. As can be appreciated from the timing chart shown in FIG. 5, for example, during the kick-down downshifting action, the target pulley ratio (the desired pulley ratio) is different depending on the degree of the throttle opening TVO. Under a particular condition where the pulley ratio command value is changed from ip1 to ip2 (or ip2') as a result of retrieval from the preprogrammed speed-change control characteristic map on the basis of the throttle opening obtained during the kick-down downshifting action, the time constant producing the target pulley ratio is set at a relatively short time duration T if the throttle opening TVO is large, and is set at a relatively long time duration T' (T<T') if the throttle opening TVO is small (see the difference of the length of T and the length of T' in FIG. 5). In the shown embodiment, the speed-change velocity is determined or set to be different depending on both the given target pulley ratio and the engine/vehicle operating conditions. The speed-change flow rate arithmetic-calculation section 14 uses the actual pulley ratio as a parameter, and arithmetically calculates or retrieves a ratio of the speed-change flow rate to the speed-change velocity from a predetermined or preprogrammed characteristic map showing the relationship between a predetermined ratio of the speed-change flow rate to the speed-change velocity and an actual pulley ratio (a transmission ratio). The speed-change flow-rate/speed-change velocity ratio indicative informational data retrieved within the speed-change flow rate arithmetic-calculation section 14 is output into the integrator 15. FIG. 6A shows an example of the predetermined characteristic map showing the relationship between a predetermined ratio of the speed-change flow rate to the speed-change velocity and an actual pulley ratio. Actually, the characteristic map as shown in FIG. 6A is determined depending on structural shape and dimensions of the primary and secondary pulleys 1 and 2 and the drive belt 3 or geometrical relationship among them. On the other hand, FIG. 6B shows the relationship between a pulley stroke of each of the primary and secondary pulleys and an actual pulley ratio. The characteristic curves of FIG. 6B are plotted on the assumption that the absolute value of the pulley stroke is zero when the actual pulley ratio is set at the maximum. As appreciated from the two characteristic curves shown in FIG. 6B, the rate of change (the gradient) of each of the primary pulley stroke and the secondary pulley stroke tends to increase, as the actual pulley ratio changes from a low pulley ratio to a high pulley ratio. This means that the amount of pulley stroke tends to become greater at the high pulley-ratio side, even when the time rate of change of the pulley ratio is same. The time rate of change of the pulley ratio is the speed-change velocity, whereas the amount of pulley stroke is proportional to the speed-change flow rate. Thus, as can be appreciated from the gently convex left-hand side with respect to the inflection point of the characteristic curve of FIG. 6A, the ratio of the speed-change flow rate to the speed-change velocity moderately increases, as the actual pulley ratio changes towards the maximum pulley ratio. Assuming that a pressure-receiving surface area of the primary pulley 1 is denoted by Ap, a pressure-receiving surface area of the primary pulley 2 is denoted by As, a displacement of the primary pulley during stroke of the primary pulley 1 is denoted by Xp, and a displacement of the secondary pulley during stroke of the secondary pulley 2 is denoted by Xs, the relationship defined by dXp/dt≠dXs/dt is concluded under a particular condition ($P_{pri} \neq P_{sec}$) where the primary pulley pressure $P_{pri}$ is not equal to the secondary pulley pressure $P_{sec}$, even when the primary-pulley pressure-receiving surface area Ap is equal to the secondary-pulley pressure-receiving surface area As. In other words, during the speed-change operating mode, the primary pulley speed (dXp/dt) during the stroke of the primary pulley 1 is not equal to the secondary pulley speed (dXs/dt), even when the condition of Ap=As is satisfied under the particular condition of $P_{pri} \neq P_{sec}$. The secondary pulley pressure $P_{sec}$ is affected by the pressure differential between the primary and secondary pulley pressures $P_{pri}$ and $P_{sec}$, and also affected by the difference between the primary and secondary pulley speeds dXp/dt and dXs/dt. For the reasons set out above, the system of the embodiment executes the feedforward compensation as previously discussed in the block 12 (the first controller 12) of FIG. 2. The third controller 13 arithmetically calculates or determines a speed-change velocity on the basis of both the target pulley ratio and the actual pulley ratio. The integrator 15 receives two input informational data, namely a first input informational signal from the speed-change flow rate arithmetic-calculation section 14 and representative of the ratio of the speed-change flow-rate to the speed-change velocity ratio, and a second input informational signal from the third controller 13 and representative of the speed-change velocity, and then multiplies the first input informational signal data by the second input informational signal data to produce a speed-change flow rate indicative output signal. The second controller 16 receives the speed-change flow rate indicative output signal from the integrator 15. The second controller 16 serves as a second motor control section which controls the second motor 7 in response to the speed-change flow rate indicative signal from the integrator 15. During the downshifting action, the second controller 16 drives the second motor 7 in a rotational direction that the working fluid (oil) is exhausted from the primary pulley actuation chamber, and thus produces the stroke of primary pulley travel (the downshifting control action), while reducing the primary pulley pressure $P_{pri}$. At this time, if the actual stroke of the primary pulley 1 does not follow up adequately satisfactorily in comparison with the working-oil flow rate produced by the second motor-driven oil pump 5, there is a tendency for the primary pulley pressure $P_{pri}$ to excessively drop. In such a case, there is a possibility that the primary pulley pressure $P_{pri}$ undesirably reduces to below a lowest primary pulley pressure needed to prevent slippage of the drive belt 3. To avoid this, during the downshifting action, the second controller 16 outputs the second motor-driven oil pump control signal (O/P2 control signal) to the second motor 7 of the second motor-driven oil pump 5, so that the speed-change flow rate is limited to a "primary capacity holding flow rate" at which the lack of the belt capacity is prevented and thus there is no slippage of the drive belt on the primary and secondary pulleys. The primary capacity holding flow rate means a maximum speed-change flow rate capable of holding the actual primary pulley pressure $P_{pri}$ at a pressure level above the lowest primary pulley pressure and also capable of producing a capacity required for exerting a grip of the drive belt 3 on the two opposing inner side walls of the V groove in the primary pulley side. Note that the maximum speed-change flow rate means a flow rate of working oil exhausted from the primary pulley actuation chamber via the primary pulley pressure line 9 and then discharged through the second oil pump 5 toward the secondary pulley pressure line 8, during the downshifting control action. The previously-noted lowest primary pulley pressure arithmetic-calculation section (or the lowest working-pressure arithmetic-calculation section) 17 arithmetically calculates or retrieves a lowest primary pulley pressure which is based on both the input torque and the actual pulley ratio and is needed to hold the previously-noted belt capacity (or to prevent the drive-belt slippage), from a predetermined or preprogrammed characteristic map showing the relationship among the input torque, the actual pulley ratio, and the lowest primary pulley pressure. The fourth controller 18 receives the two input informational data, namely the actual primary pulley pressure indicative signal from the primary pulley pressure sensor 20 and the lowest primary pulley pressure indicative signal from the lowest primary pulley pressure arithmetic-calculation section 17. Thereafter, the fourth controller 18 arithmetically calculates or determines the previously-noted primary capacity holding flow rate capable of holding the primary pulley pressure $P_{pri}$ at a pressure level above the lowest primary pulley pressure. The secondary pulley pressure sensor 19 is provided to sense or detect the actual secondary pulley pressure, whereas the primary pulley pressure sensor 20 is provided to sense or detect the actual primary pulley pressure.

Hereinafter described in detail is the operation of the transmission control system (the belt-type CVT control system) of the embodiment.

During the speed-change control action, on one hand, within the first controller 12, in addition to the feedback control according to which the actual secondary pulley pressure is adjusted to the target secondary pulley pressure (the desired secondary pulley pressure) needed to hold the previously-discussed belt capacity, the feed-forward compensation, which is based on changes in the speed-change flow rate for the second motor-driven oil pump (O/P2) 5, is performed. In this manner, the first motor 6 of the first motor-driven oil pump 4 is controlled in response to the O/P1 control signal from the first controller 12, by way of the feed-forward compensation as well as the feedback control. On the other hand, within the second controller 16, during the speed-change flow rate control where the actual pulley ratio is adjusted toward the target pulley ratio (the desired pulley ratio), the speed-change flow rate is limited to the previously-noted primary capacity holding flow rate so that the actual primary pulley pressure $P_{pri}$ does not reduce to below a lowest primary pulley pressure (corresponding to a lowest hydraulic pressure in the primary pulley actuation chamber being able to hold the belt capacity). In other words, with the speed-change flow rate limiting control, the actual primary pulley pressure $P_{pri}$ is prevented from reducing to below a lowest primary pulley pressure required to hold the belt capacity. In this manner, the second motor 7 of the second motor-driven oil pump 5 is controlled in response to the O/P2 control signal from the second controller 16, by limiting the speed-change flow rate (or with the speed-change flow rate limiting control). The first motor-driven oil pump 4 operates to directly supply the controlled secondary pulley pressure $P_{sec}$ to the secondary pulley actuation chamber therefrom. The second motor-driven oil pump 5 operates to directly supply the controlled primary pulley pressure $P_{pri}$ to the primary pulley actuation chamber therefrom, and also enables the working oil to come and go between the primary pulley actuation chamber and the secondary pulley actuation chamber through the oil pump 5, as occasion demands. As can be appreciated from the flow from the integrator 15 and the fourth controller via the second controller 16 to the second motor 7, during the speed-change operating mode, the primary pulley side speed-change control action is actually made by way of the flow-rate control for the primary pulley actuation chamber, for the reasons discussed below.

Figure 7:
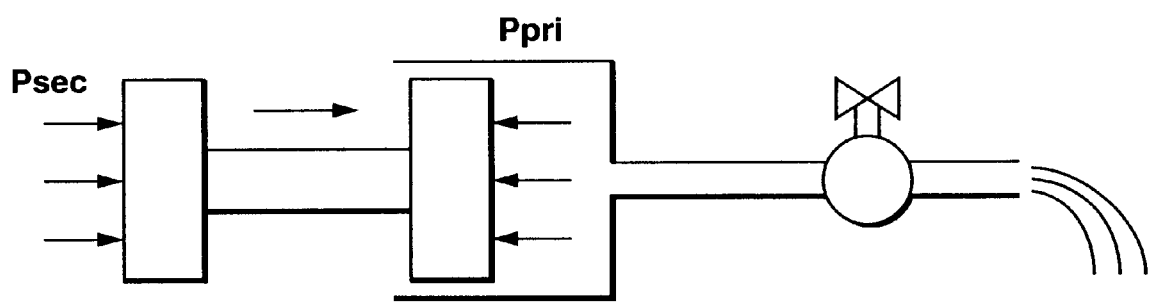
FIG. 7 is an explanatory view illustrating an operating state of each of the primary and secondary pulleys during the downshifting action where working oil is released from the primary pulley actuation cylinder.

That is, the speed-change velocity and the speed-change flow rate are correlated with each other, as follows. Speed-change velocity→Pulley speed during stroke of pulley→Change in volumetric capacity of pulley actuation chamber per unit time (unit hour)→Inflow/outflow (Flow rate) However, during the downshifting action that the working oil is exhausted from the primary pulley actuation chamber of the primary pulley 1, assuming that the degree of fluid-constriction (fluid-restriction) of the primary pulley pressure circuit becomes excessively greater, that is, in presence of the excessive rotational speed of the second oil pump 5 for the purpose of rapid speed-change control action, the secondary pulley actuation chamber of the secondary pulley 2 tends to be narrowed, while the primary pulley actuation chamber of the primary pulley 1 tends to be widen (see FIG. 7). In such a case, as a consequence, the primary pulley pressure $P_{pri}$ tends to drop.

Figure 8A:
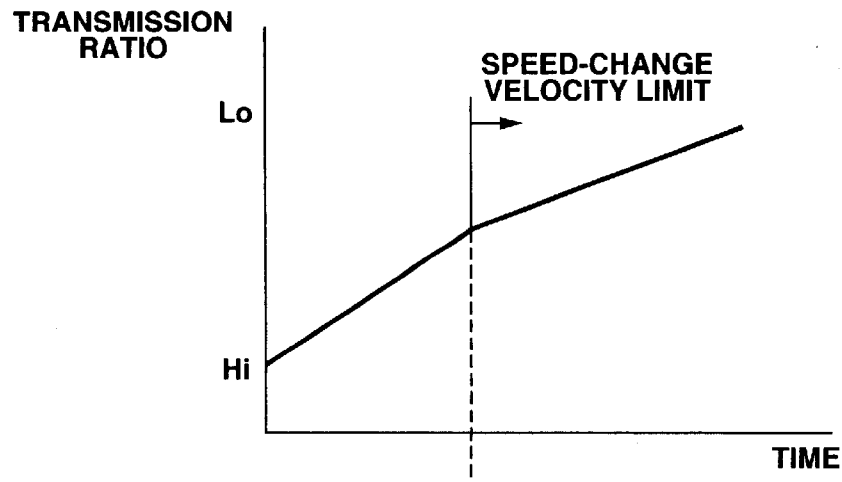
FIG. 8A is a timing chart illustrating variations in the pulley ratio during speed-change flow rate limiting control performed by the belt-type continuously variable automatic transmission control system of the embodiment.
Figure 8B:
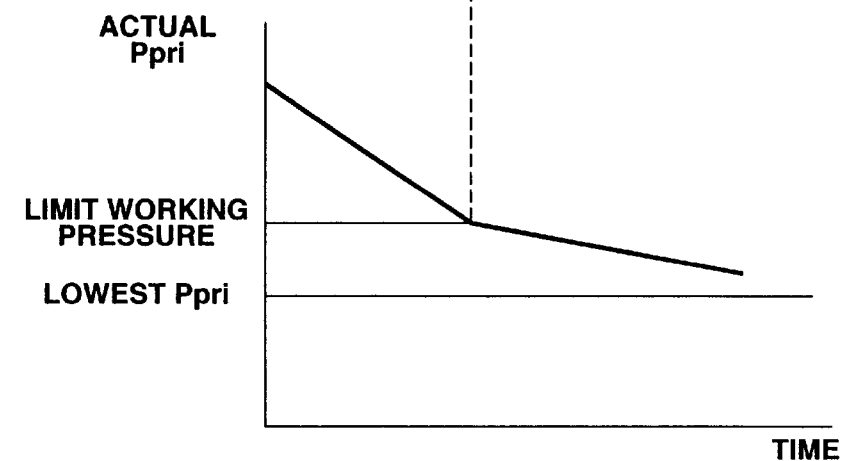
FIG. 8B is a timing chart illustrating variations in the actual primary pulley pressure during the speed-change flow rate limiting control.
Figure 8C:
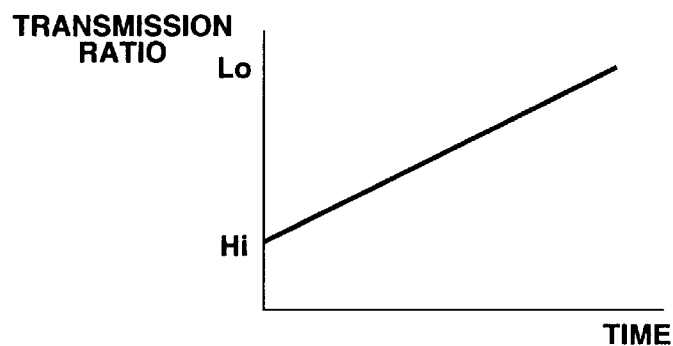
FIG. 8C is a timing chart illustrating variations in the pulley ratio without the speed-change flow rate limiting control.
Figure 8D:
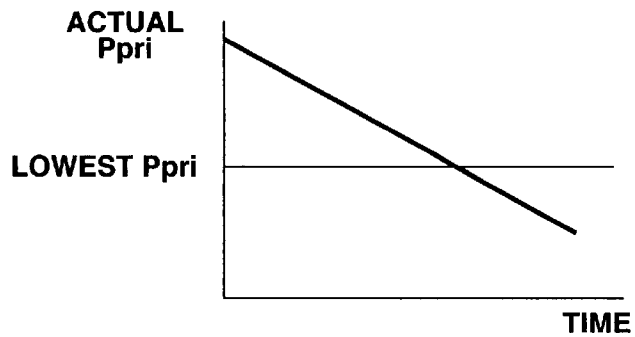
FIG. 8D is a timing chart illustrating variations in the actual primary pulley pressure without the speed-change flow rate limiting control.

Suppose the second motor-driven oil pump 5 is driven by the speed-change velocity (or the speed-change flow rate), only based on the target pulley ratio and the actual pulley ratio, and then the speed-change control operation is made without speed-change flow rate limiting control, during downshifting action. In such a case, as seen in FIGS. 8C and 8D, if a control command signal value for the speed-change velocity is excessively high during the downshifting action, there is a possibility that the actual stroke of the primary pulley 1 does not follow up adequately in comparison with the flow rate of working oil produced by the pump 5 and thus the actual primary pulley pressure reduces to below the lowest primary pulley pressure level. In this case, assuming that the same speed-change velocity (the undesiredly high speed-change velocity) is still continued during the speed-change operating mode (the downshifting mode), there is an increased tendency for the drive-belt slippage to occur. In contrast to the above, in the system of the embodiment, when the second motor-driven oil pump 5 is driven by the speed-change velocity (or the speed-change flow rate), only based on the target pulley ratio and the actual pulley ratio, the speed-change control operation is made with speed-change flow rate limiting control during downshifting action. According to the speed-change flow rate limiting control, as seen in FIGS. 8A and 8B, when the actual primary pulley pressure reduces to below a predetermined pressure level (a predetermined limit working pressure), the speed-change velocity is limited so that the actual primary pulley pressure $P_{pri}$ never falls below the lowest primary pulley pressure level, thus preventing the drive-belt slippage during the downshifting action. During the speed-change velocity limiting control, it is preferable that the limit working pressure and/or the speed-change velocity limited (or reduced) after the speed-change velocity limiting control are variably set depending on the primary pulley pressure reduction rate (or the primary pulley pressure decreasing rate). Concretely, the system of the embodiment executes the speed-change flow rate limiting control as described hereunder.

Figure 9A:
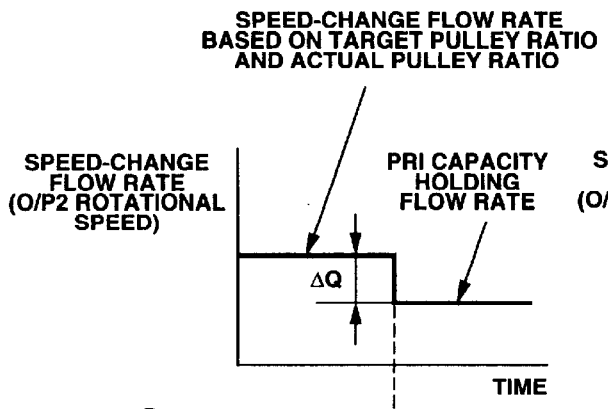
FIGS. 9A to 9C are timing charts showing characteristics (variations in change-speed flow rate, variations in transmission ratio (pulley ratio), and variations in actual primary pulley pressure $P_{pri}$) obtained by way of a first speed-change flow rate limiting control.
Figure 9B:
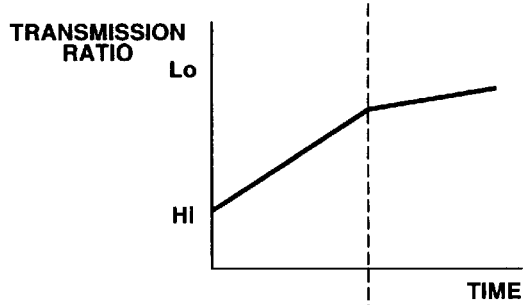
Figure 9C:
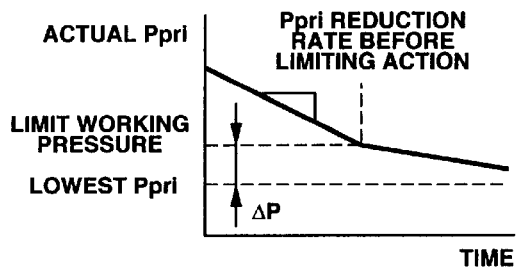
Figure 9D:
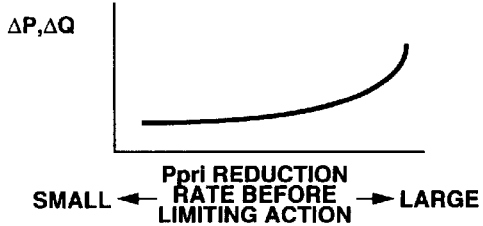
FIG. 9D is a characteristic curve showing the relationship among the difference $\Delta P$ between the limit working pressure and the lowest primary pulley pressure, the difference $\Delta Q$ between the speed-change flow rate and the primary capacity holding flow rate, and the primary pulley pressure reduction rate obtained before the first speed-change flow rate limiting control action.

Referring now to FIGS. 9A through 9D, there are shown the characteristics obtained by way of the first speed-change flow rate limiting control executed by the system of the embodiment. In the first speed-change flow rate limiting control, as shown in FIGS. 9A and 9C, the system basically uses two parameters $\Delta Q$ and $\Delta P$. The parameter denoted by $\Delta Q$ is defined by taking the difference between the speed-change flow rate determined by both the target pulley ratio and the actual pulley ratio, and the primary capacity holding flow rate. On the other hand, the parameter denoted by $\Delta P$ is defined by taking the difference between the limit working pressure and the lowest primary pulley pressure. First of all, the system of the embodiment determines or retrieves the two parameters $\Delta P$ and $\Delta Q$ on the basis of the primary pulley pressure reduction rate before the speed-change flow rate limiting control action (see FIG. 9D). Second, the system determines the limit working pressure on the basis of both the lowest primary pulley pressure and the parameter $\Delta P$ determined or retrieved. Third, the speed-change flow rate is updated by the primary capacity holding flow rate (the belt capacity holding flow rate) obtained by subtracting the parameter $\Delta Q$ from a more recent value of the speed-change flow rate, when the actual primary pulley pressure reduces to below the limit working pressure. In this manner, as soon as the actual primary pulley pressure $P_{pri}$ reaches the limit working pressure level, the system decreasingly compensates for the speed-change velocity (see the limited pulley ratio, that is, the right-hand side comparatively moderately-inclined part of the polygonal line of FIG. 9B).

Figure 9E:
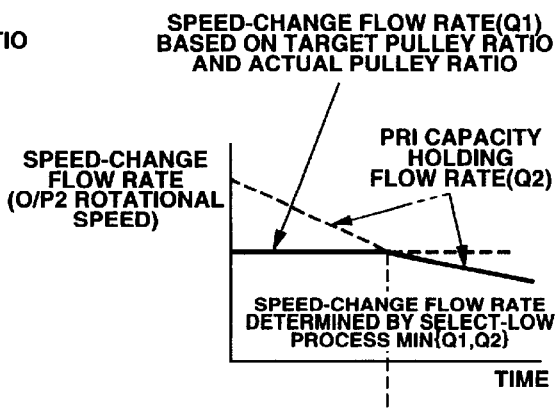
FIGS. 9E to 9G are timing charts showing characteristics (variations in change-speed flow rate, variations in transmission ratio (pulley ratio), and variations in actual primary pulley pressure $P_{pri}$) obtained by way of a second speed-change flow rate limiting control.
Figure 9F:
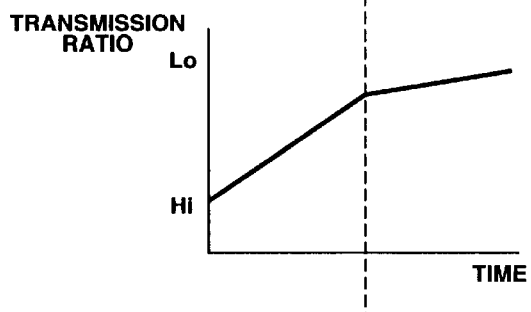
Figure 9G:
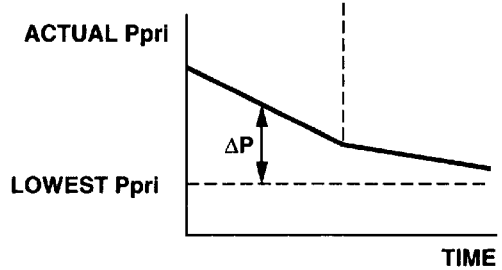
Figure 9H:
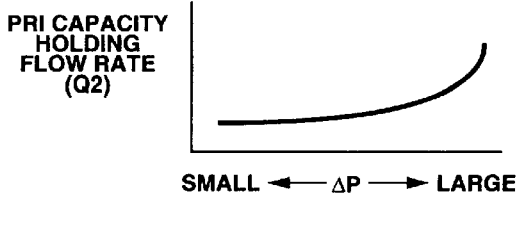
FIG. 9H is a characteristic curve showing the relationship between the primary capacity holding flow rate Q2 and the differential pressure $\Delta P$ between the actual primary pulley pressure $P_{pri}$ and the lowest primary pulley pressure, used during the second speed-change flow rate limiting control action.

Referring now to FIGS. 9E through 9H, there are shown the characteristics obtained by way of the second speed-change flow rate limiting control executed by the system of the embodiment. In the second speed-change flow rate limiting control, as shown in FIG. 9E, the system basically uses two parameters Q1 and Q2. The speed-change flow rate (for the second oil pump 5) determined by both the target pulley ratio and the actual pulley ratio is denoted by Q1, whereas the primary capacity holding flow rate (the belt capacity holding flow rate) for the second oil pump 5 is denoted by Q2. As discussed previously, the primary capacity holding flow rate Q2 corresponds to a maximum speed-change flow rate capable of holding the actual primary pulley pressure $P_{pri}$ at a pressure level above the lowest primary pulley pressure. That is, the primary capacity holding flow rate Q2 corresponds to the previously-noted belt capacity holding flow rate. According to the second speed-change flow rate limiting control, first of all, the system determines or retrieves the primary capacity holding flow rate (the maximum speed-change flow rate) Q2 for the second oil pump 5, on the basis of the pressure differential $\Delta P$ between the actual primary pulley pressure $P_{pri}$ and the lowest primary pulley pressure, from the characteristic map as shown in FIG. 9H. Then, the system compares the speed-change flow rate Q1 based on the target pulley ratio and the actual pulley ratio with the primary capacity holding flow rate Q2, and selects a smaller one of the two flow rates Q1 and Q2 by way of a so-called select-LOW process MIN {Q1, Q2} (see the solid polygonal line of FIG. 9E). As discussed above, according to the second speed-change flow rate limiting control, the second motor 7 of the second oil pump 5 is controlled in response to the smaller flow rate selected from the two flow rates Q1 and Q2 through the select-LOW process MIN (Q1, Q2). This effectively suppress the speed-change velocity to excessively develop (see FIGS. 9F and 9G), thereby preventing the undesired drive-belt slippage during the downshifting action.

Figure 10A:
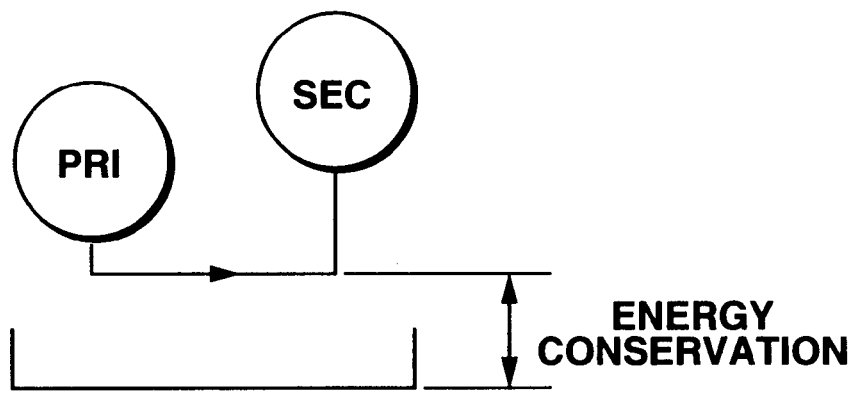
FIGS. 10A and 10B are explanatory views showing comparison between a first required pressure supply principle based on the differential pressure between the primary and secondary pulley actuation chambers and a second required pressure supply principle based on an atmospheric pressure level, from a viewpoint of energy conservation.
Figure 10B:
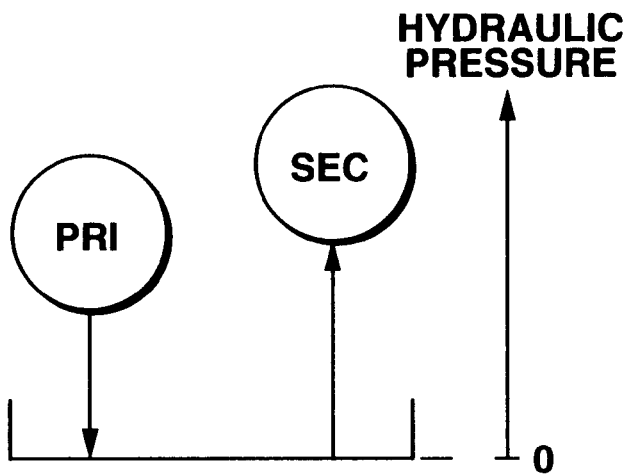

As will be appreciated from the above, the transmission control system (the belt-type CVT control system) of the embodiment is constructed, so that the working pressures in the adjustable flanges (the axially-slidable flanged pistons) of the primary and secondary pulleys 1 and 2 are directly controlled with the two motor-driven oil pumps 4 and 5, and therefore it is unnecessary to incorporate complicated hydraulic circuits and control valves into the CVT control system. Thus, the CVT control system of the embodiment has a greatly-reduced tendency of oil leakage from the hydraulic system containing the hydraulic control unit. This reduces energy loss. In the CVT control system of the embodiment, the two motor-driven oil pumps are used in place of an engine-driven oil pump, and thus it is possible to electronically control and constantly optimize the discharge from each of the motor-driven oil pumps 4 and 5, regardless of engine operating conditions. As a whole, the use of motor-driven oil pumps contributes to reduced energy consumption as compared with an engine-driven oil pump. In the shown embodiment, the hydraulic control system of the transmission control means (or the transmission control device) is constructed by the two motor-driven oil pumps 4 and 5 which are able to produce hydraulic pressure even when the engine is not running. This enables the use of a so-called idle-stop control device on automotive vehicles with a CVT. Additionally, the system of the embodiment is constructed, so that the first motor-driven oil pump 4 serves as a pressure holding pump, the second motor-driven oil pump 5 serves as a speed-change pump, and so that the hydraulic circuit is constructed to enable the working oil to come and go between the actuation chambers of the primary and secondary pulleys 1 and 2 through the speed-change pump (the second oil pump 5). As appreciated from comparison between the two explanatory views shown in FIGS. 10A and 10B, the first required pressure supply principle, which is based on the differential pressure between the primary and secondary pulley actuation chambers and used on the system of the embodiment, is superior in energy conservation to the second required pressure supply principle, which is based on the atmospheric pressure level. According to the first required pressure supply principle shown in Fog. 10A, it is possible to reduce the energy consumption of the second motor-driven oil pump 5 needed to transfer between the primary and secondary pulleys 1 and 2 during the speed-change operating mode to only the pressure differential between the primary and secondary pulley actuation chambers. Thus, the required maximum output for the second motor-driven oil pump 5 can be reduced. This contributes to small-sizing of the second motor 7. Assuming that the pressure level of a primary pulley pressure $P_{pri}$ supplied to the primary pulley actuation cylinder and the pressure level of a secondary pulley pressure $P_{pri}$ supplied to the secondary pulley actuation cylinder are controlled independently of each other by means of the respective motor-driven oil pumps, both of the motor-driven oil pumps must be controlled in accordance with the pressure control based on the atmospheric pressure (see FIG. 10B). This wastefully increases the required maximum output for each of the motor-driven oil pumps.

Furthermore, in the CVT control system of the embodiment, the first controller 12, which controls the first motor-driven oil pump 4, is designed or constructed as a control means capable of performing feedforward compensation based on changes in the speed-change flow rate for the second motor-driven oil pump 5, in addition to feedback control according to which an actual secondary pulley pressure is adjusted to a target secondary pulley pressure needed to hold the belt capacity. By virtue of the feedforward compensation, the operating state of the second oil pump (O/P2) 5 tends to be stable and almost unaffected by changes in the speed-change flow rate during the speed-change control action, and thus the actual secondary pulley pressure $P_{sec}$ is effectively reliably maintained at the target secondary pulley pressure (the desired secondary pulley pressure), thus stably holding the belt capacity in the secondary pulley side during the speed-change control action. As can be appreciated from simulation results shown in FIGS. 11A to 11C, during such a speed-change control operating mode wherein the pulley ratio of the CVT is shifted from a low gear ratio (low pulley ratio) to a high gear ratio (high pulley ratio), a CVT control system with no feedforward compensation exhibits a secondary-pulley-pressure characteristic that the actual secondary pulley pressure $P_{sec}$ greatly fluctuates and swings on both sides of the desired value (the target secondary pulley pressure), and gradually converges onto the desired value with the lapse of time. On the other hand, a CVT control system with feedforward compensation exhibits a secondary-pulley-pressure characteristic that the actual secondary pulley pressure $P_{sec}$ is stably held almost at the desired value (the target secondary pulley pressure) from the beginning of shifting of the pulley ratio from low to high (from the time when initiating the discharging action of working oil toward the primary pulley 1 by means of the second oil pump 5 to narrow the width of the V groove of the primary pulley).

Figure 1:
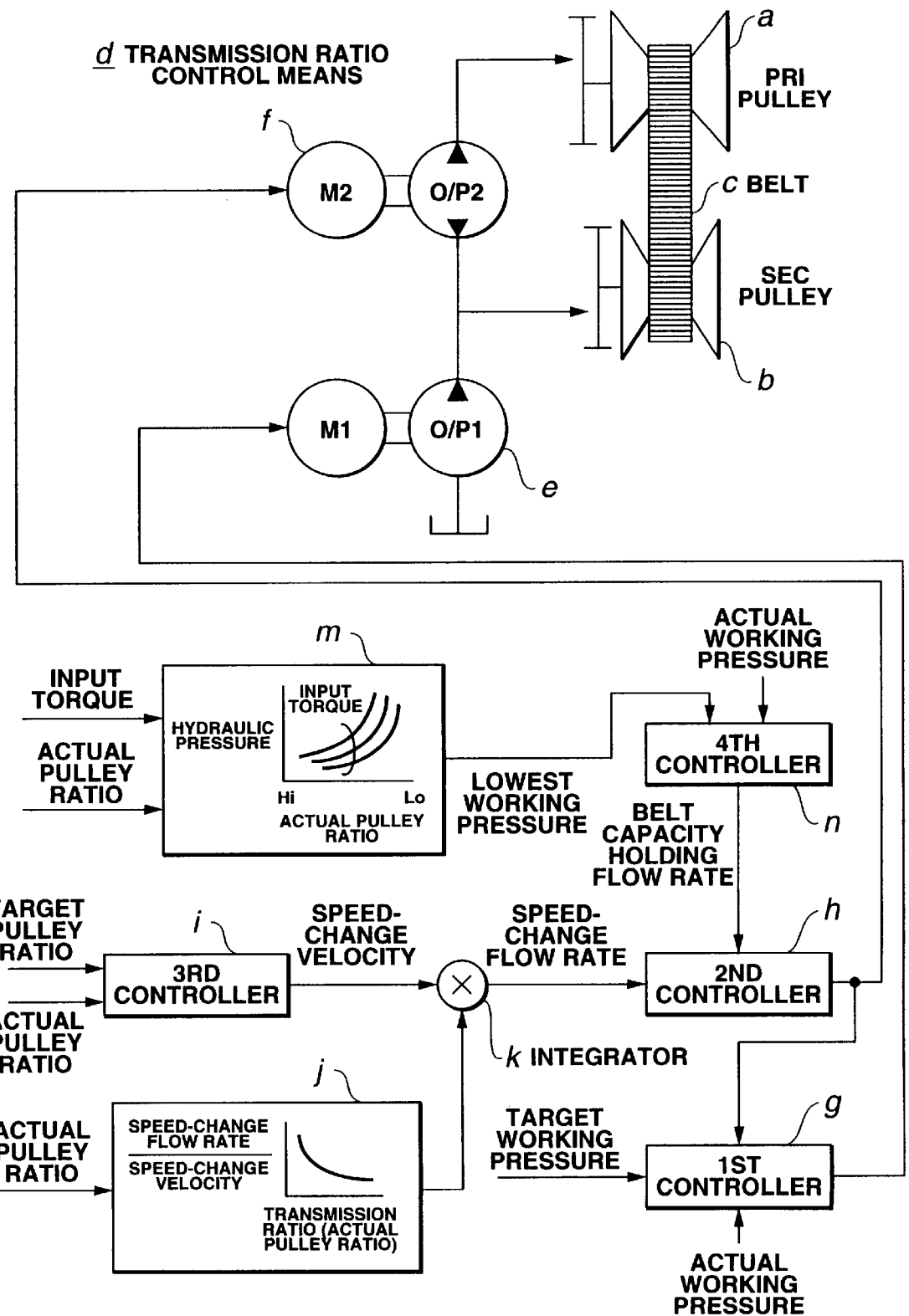
FIG. 1 is a system block diagram illustrating the essential part of one embodiment of a belt-type continuously variable automatic transmission control system of the invention.

Referring now to FIG. 1, there is shown the essential arrangement of the CVT control system of the invention. As shown in FIG. 1, in a belt-type CVT control system employing a primary pulley a, a secondary pulley b, a drive belt C running in the primary and secondary pulleys, and a transmission ratio control device (or a transmission ratio control means d), the transmission ratio control device d includes a first motor-driven oil pump e which supplies working pressure directly to one of a primary pulley actuation chamber associated with the primary pulley and a secondary pulley actuation chamber associated with the secondary pulley, a second motor-driven oil pump f which supplies working pressure directly to the other of the primary and secondary pulley actuation chambers, and enables working oil to come and go between the primary and secondary pulley actuation chambers therethrough, a first controller g which controls the first motor-driven oil pump e so that the working pressure supplied to the one pulley actuation chamber and actually sensed is adjusted to a target working pressure needed to hold a belt capacity of the drive belt a, and a second controller h which controls the second motor-driven oil pump f by limiting one of a speed-change flow rate and a speed-change velocity, so that the working pressure supplied to the other pulley actuation chamber and actually sensed is prevented from reducing to below a lowest working pressure capable of holding the belt capacity, in controlling one of the speed-change flow rate and the speed-change velocity so that an actual pulley ratio is adjusted to a target pulley ratio during speed-change control action. As discussed above, the second controller h incorporated in the CVT control system of the invention, performs the speed-change flow rate limiting control for the second motor-driven oil pump f. Thus, it is possible to ensure the belt capacity in the one pulley actuation chamber side, even during downshifting action where the working oil is exhausted from the one pulley actuation chamber. Undesired slippage of the drive belt c running in the pulleys a and b can be prevented by the speed-change flow rate limiting control performed by the second controller h. Within the third controller i incorporated in the CVT control system of the invention, a speed-change velocity is arithmetically calculated or retrieved on the basis of a target pulley ratio and an actual pulley ratio. Input information indicative of a sensed or detected value of the actual pulley ratio is input into the speed-change flow rate arithmetic-calculation section j. The speed-change flow rate arithmetic-calculation section j arithmetically calculates or retrieves a ratio of speed-change flow rate to speed-change velocity from a predetermined or preprogrammed characteristic map data showing how the ratio of speed-change flow rate to speed-change velocity has to be varied relative to the actual pulley ratio (serving as a parameter). Thereafter, within the integrator k, the output signal (indicative of the speed-change velocity) from the third controller i is multiplied with the output signal (indicative of the ratio of speed-change flow rate to speed-change velocity) from the speed-change flow rate arithmetic-calculation section j, to produce an output signal indicative of a calculated speed-change flow rate. The output signal (indicative of the calculated speed-change flow rate) from the integrator k is used as an input informational data (a speed-change flow rate data) for the second controller h. The arithmetic-calculation or retrieval of a speed-change flow rate indicative input informational data from the predetermined map data is simple in construction or in arithmetic processing.

The lowest working pressure arithmetic-calculation section m incorporated in the CVT control system of the invention, receives input information indicative of the detected value of the actual pulley ratio and the detected value of the input torque. The lowest working pressure arithmetic-calculation section m arithmetically calculates or retrieves a lowest working pressure from a predetermined characteristic map data showing how the lowest working pressure has to be varied relative to the actual pulley ratio and the input torque both serving as parameters. The arithmetic-calculation or retrieval of a lowest working pressure indicative informational data. from the predetermined characteristic map data is also simple in construction or in arithmetic processing.

The fourth controller n incorporated in the CVT control system of the invention, receives input information indicative of the lowest working pressure and the actual working pressure supplied to the other of the primary and secondary pulley actuation chambers. Then, the fourth controller n arithmetically calculates a belt capacity holding flow rate capable of holding the actual working pressure supplied to the other of the primary and secondary pulley actuation chambers above the lowest working pressure, on the basis of both these input informational data (preferably, the difference ΔP between these informational data). The previously-noted calculated speed-change flow rate input into the second controller h is compared to the belt capacity holding flow rate calculated by the fourth controller n. The second controller h performs a select-LOW process, so that the second motor-driven oil pump f is controlled on the basis of a smaller one selected from the calculated speed-change flow rate and the belt capacity holding flow rate. Therefore, the speed-change flow rate can be effectively limited by the use of a comparatively simple select-LOW process so that the actual working pressure does not reduce to below the lowest working pressure.

The entire contents of Japanese Patent Application No. P10-369142 (filed Dec. 25, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electronic transmission control system for an automotive vehicle with a belt-type continuously variable automatic transmission employing a primary pulley with a primary pulley actuation chamber, a secondary pulley with a secondary pulley actuation chamber, and a drive belt running in the primary and secondary pulleys whose effective diameters are continuously variable to provide varying pulley ratios, comprising:

a transmission ratio control device including:
(a) a first motor-driven oil pump which supplies working pressure directly to one of the primary and secondary pulley actuation chambers;
(b) a second motor-driven oil pump which supplies working pressure directly to the other of the primary and secondary pulley actuation chambers, and enables working oil to come and go between the primary and secondary pulley actuation chambers therethrough;
(c) pressure sensors which detect an actual working pressure supplied to the one of the primary and secondary pulley actuation chambers, and an actual working pressure supplied to the other of the primary and secondary pulley actuation chambers;
(d) a first control section which controls said first motor-driven oil pump so that the actual working pressure supplied to the one of the primary and secondary pulley actuation chambers is adjusted to a target working pressure needed to hold a belt capacity of the drive belt, said belt capacity being defined as a capacity required for exerting a grip of the drive belt on the primary and secondary pulleys; and (e) a second control section which controls said second motor-driven oil pump by limiting one of a speed-change flow rate and a speed-change velocity, so that the actual working pressure supplied to the other of the primary and secondary pulley actuation chambers is prevented from reducing to below a lowest working pressure capable of holding the belt capacity, in controlling one of the speed-change flow rate and the speed-change velocity so that an actual pulley ratio is adjusted to a target pulley ratio during speed-change control action, said speed-change flow rate being defined as a required flow rate needed for the speed-change control action, and said speed-change velocity being defined as a time rate of change of the pulley ratio.

2. The electronic transmission control system as claimed in claim 1, which further comprises a third control section arithmetically calculating the speed-change velocity on the basis of the target pulley ratio and the actual pulley ratio, a speed-change flow rate arithmetic-calculation section arithmetically calculating a ratio of speed-change flow rate to speed-change velocity on the basis of the actual pulley ratio from a predetermined characteristic map showing how the ratio of speed-change flow rate to speed-change velocity has to be varied relative to the actual pulley ratio serving as a parameter, and an integrator multiplying the speed-change velocity calculated by said third control section with the ratio of speed-change flow rate to speed-change velocity calculated by said speed-change flow rate arithmetic-calculation section to produce an output signal indicative of a calculated speed-change flow rate, and wherein said second control section uses the output signal from said integrator as input information representative of the speed-change flow rate.

3. The electronic transmission control system as claimed in claim 2, which further comprises a lowest working pressure section receiving input information indicative of the actual pulley ratio and an input torque, and arithmetically calculating the lowest working pressure on the basis of the actual pulley ratio and the input torque from a predetermined characteristic map showing how the lowest working pressure has to be varied relative to the actual pulley ratio and the input torque both serving as parameters.

4. The electronic transmission control system as claimed in claim 3, which further comprises a fourth control section receiving input information indicative of the lowest working pressure and the actual working pressure supplied to the other of the primary and secondary pulley actuation chambers, and arithmetically calculating a belt capacity holding flow rate capable of holding the actual working pressure supplied to the other of the primary and secondary pulley actuation chambers above the lowest working pressure, on the basis of the input information, and wherein said second control section performs a select-LOW process, so that the calculated speed-change flow rate is compared with the belt capacity holding flow rate, and so that said second motor-driven oil pump is controlled on the basis of a smaller one selected from the calculated speed-change flow rate and the belt capacity holding flow rate.

5. A belt-type continuously variable automatic transmission whose pulley ratio is defined as a ratio of transmission input to output speed and is changeable continuously, comprising:

a primary pulley serving as a drive pulley and having primary pulley actuation chamber;

a secondary pulley serving as a driven pulley and having a secondary pulley actuation chamber;

a drive belt running in the primary and secondary pulleys whose effective diameters are continuously variable to provide varying pulley ratios;

a transmission ratio control device including:

(a) a first motor-driven oil pump which supplies working pressure directly to the secondary pulley actuation chamber;

(b) a second motor-driven oil pump which supplies working pressure directly to the primary pulley actuation chamber, and enables working oil to come and go between the primary and secondary pulley actuation chambers therethrough;

(c) pressure sensors which detect an actual primary pulley pressure supplied to the primary pulley actuation chamber, and an actual secondary pulley pressure supplied to the secondary pulley actuation chamber;

(d) a first control section which controls said first motor-driven oil pump so that the actual secondary pulley pressure is adjusted to a target working pressure needed to hold a belt capacity of the drive belt, said belt capacity being defined as a capacity required for exerting a grip of the drive belt on the primary and secondary pulleys;

(e) a lowest working pressure arithmetic-calculation section arithmetically calculating a lowest primary pulley pressure capable of holding the belt capacity, on the basis of the pulley ratio and an input torque transmitted to the primary pulley;

(f) an arithmetic-calculation section arithmetically calculating a speed-change flow rate based on both a target pulley ratio and the actual pulley ratio and needed for speed-change control action;

(g) an arithmetic-calculation section arithmetically calculating a belt capacity holding flow rate at which a lack of the belt capacity is prevented and thus there is no slippage of the drive belt on the primary and secondary pulleys, on the basis of both the lowest working pressure and the actual primary pulley pressure; and (h) a second control section having a data processing section performing functions;

retrieving two parameters $\Delta P$ and $\Delta Q$ on the basis of a reduction rate of the primary pulley pressure from a predetermined characteristic map, said parameter $\Delta P$ being defined by taking a difference between a limit working pressure and the lowest primary pulley pressure, and said parameter $\Delta Q$ being defined by taking a difference between the speed-change flow rate and the belt capacity holding flow rate;

determining the limit working pressure on the basis of both the lowest primary pulley pressure and the parameter $\Delta P$ retrieved; and updating the speed-change flow rate by the belt capacity holding flow rate obtained by subtracting the parameter $\Delta Q$ from a more recent value of the speed-change flow rate to perform a speed-change flow rate limiting control for said second motor-driven oil pump, when the actual primary pulley pressure reduces to below the limit working pressure.

6. A belt-type continuously variable automatic transmission whose pulley ratio is defined as a ratio of transmission input to output speed and is changeable continuously, comprising:

a primary pulley serving as a drive pulley and having a primary pulley actuation chamber;

a secondary pulley serving as a driven pulley and having a secondary pulley actuation chamber;

a drive belt running in the primary and secondary pulleys whose effective diameters are continuously variable to provide varying pulley ratios;

a transmission ratio control device including:

(a) a first motor-driven oil pump which supplies working pressure directly to the secondary pulley actuation chamber;

(b) a second motor-driven oil pump which supplies working pressure directly to the primary pulley actuation chamber, and enables working oil to come and go between the primary and secondary pulley actuation chambers therethrough;

(c) pressure sensors which detect an actual primary pulley pressure supplied to the primary pulley actuation chamber, and an actual secondary pulley pressure supplied to the secondary pulley actuation chamber;

(d) a first control section which controls said first motor-driven oil pump so that the actual secondary pulley pressure is adjusted to a target working pressure needed to hold a belt capacity of the drive belt, said belt capacity being defined as a capacity required for exerting a grip of the drive belt on the primary and secondary pulleys;

(e) a lowest working pressure arithmetic-calculation section arithmetically calculating a lowest primary pulley pressure capable of holding the belt capacity, on the basis of the pulley ratio and an input torque transmitted to the primary pulley;

(f) an arithmetic-calculation section arithmetically calculating a speed-change flow rate Q1 based on both a target pulley ratio and the actual pulley ratio and needed for speed-change control action; and (g) a second control section having a data processing section performing functions;

retrieving a belt capacity holding flow rate Q2 capable of holding the actual primary pulley pressure above the lowest working pressure, on the basis of a pressure differential between the lowest working pressure and the actual primary pulley pressure from a predetermined characteristic map;

comparing the speed-change flow rate Q1 with the belt capacity holding flow rate Q2;

selecting a smaller flow rate of the speed-change flow rate Q1 and the belt capacity holding flow rate Q2 by a select-LOW process; and controlling said second motor-driven oil pump in response to the smaller flow rate selected by the select-LOW process to perform a speed-change flow rate limiting control for said second motor-driven oil pump.

7. A transmission control method of an automotive vehicle with a belt-type continuously variable automatic transmission whose pulley ratio is defined as a ratio of transmission input to output speed and is changeable continuously, wherein the belt-type continuously variable automatic transmission includes a primary pulley serving as a drive pulley and having a primary pulley actuation chamber, a secondary pulley serving as a driven pulley and having a secondary pulley actuation chamber, a drive belt running in the primary and secondary pulleys whose effective diameters are continuously variable to provide varying pulley ratios, and a transmission ratio control device having a first motor-driven oil pump which supplies working pressure directly to the secondary pulley actuation chamber and a second motor-driven oil pump which supplies working pressure directly to the primary pulley actuation chamber and enables working oil to come and go between the primary and secondary pulley actuation chambers therethrough, the method comprising:

detecting an actual primary pulley pressure supplied to the primary pulley actuation chamber, and an actual secondary pulley pressure supplied to the secondary pulley actuation chamber;

controlling said first motor-driven oil pump so that the actual secondary pulley pressure is adjusted to a target working pressure needed to hold a belt capacity of the drive belt, said belt capacity being defined as a capacity required for exerting a grip of the drive belt on the primary and secondary pulleys;

arithmetically calculating a lowest primary pulley pressure capable of holding the belt capacity, on the basis of the pulley ratio and an input torque transmitted to the primary pulley;

arithmetically calculating a speed-change flow rate based on both a target pulley ratio and the actual pulley ratio and needed for speed-change control action;

arithmetically calculating a belt capacity holding flow rate at which a lack of the belt capacity is prevented and thus there is no slippage of the drive belt on the primary and secondary pulleys, on the basis of both the lowest working pressure and the actual primary pulley pressure;

retrieving two parameters $\Delta P$ and $\Delta Q$ on the basis of a reduction rate of the primary pulley pressure from a predetermined characteristic map, said parameter $\Delta P$ being defined by taking a difference between a limit working pressure and the lowest primary pulley pressure, and said parameter $\Delta Q$ being defined by taking a difference between the speed-change flow rate and the belt capacity holding flow rate;

determining the limit working pressure on the basis of both the lowest primary pulley pressure and the parameter $\Delta P$ retrieved; and updating the speed-change flow rate by the belt capacity holding flow rate obtained by subtracting the parameter $\Delta Q$ from a more recent value of the speed-change flow rate to perform a speed-change flow rate limiting control for said second motor-driven oil pump, when the actual primary pulley pressure reduces to below the limit working pressure.

8. A transmission control method of an automotive vehicle with a belt-type continuously variable automatic transmission whose pulley ratio is defined as a ratio of transmission input to output speed and is changeable continuously, wherein the belt-type continuously variable automatic transmission includes a primary pulley serving as a drive pulley and having a primary pulley actuation chamber, a secondary pulley serving as a driven pulley and having a secondary pulley actuation chamber, a drive belt running in the primary and secondary pulleys whose effective diameters are continuously variable to provide varying pulley ratios, and a transmission ratio control device having a first motor-driven oil pump which supplies working pressure directly to the secondary pulley actuation chamber and a second motor-driven oil pump which supplies working pressure directly to the primary pulley actuation chamber and enables working oil to come and go between the primary and secondary pulley actuation chambers therethrough, the method comprising:

detecting an actual primary pulley pressure supplied to the primary pulley actuation chamber, and an actual secondary pulley pressure supplied to the secondary pulley actuation chamber;

controlling said first motor-driven oil pump so that the actual secondary pulley pressure is adjusted to a target working pressure needed to hold a belt capacity of the drive belt, said belt capacity being defined as a capacity required for exerting a grip of the drive belt on the primary and secondary pulleys;

arithmetically calculating a lowest primary pulley pressure capable of holding the belt capacity, on the basis of the pulley ratio and an input torque transmitted to the primary pulley;

arithmetically calculating a speed-change flow rate Q1 based on both a target pulley ratio and the actual pulley ratio and needed for speed-change control action;

retrieving a belt capacity holding flow rate Q2 capable of holding the actual primary pulley pressure above the lowest working pressure, on the basis of a pressure differential between the lowest working pressure and the actual primary pulley pressure from a predetermined characteristic map;

comparing the speed-change flow rate Q1 with the belt capacity holding flow rate Q2;

selecting a smaller flow rate of the speed-change flow rate Q1 and the belt capacity holding flow rate Q2 by a select-LOW process: and controlling said second motor-driven oil pump in response to the smaller flow rate selected by the select-LOW process to perform a speed-change flow rate limiting control for said second motor-driven oil pump.

* * * * *